(12) United States Patent
Fakoorian et al.

(10) Patent No.: US 11,844,085 B2
(45) Date of Patent: Dec. 12, 2023

(54) CONFIGURED GRANTS FOR SIDELINK COMMUNICATIONS

(71) Applicant: QUALCOMM Incorporated, San Diego, CA (US)

(72) Inventors: Seyed Ali Akbar Fakoorian, San Diego, CA (US); Jing Sun, San Diego, CA (US); Rajat Prakash, San Diego, CA (US); Piyush Gupta, Bridgewater, NJ (US); Junyi Li, Chester, NJ (US)

(73) Assignee: QUALCOMM Incorporated, San Diego, CA (US)

(*) Notice: Subject to any disclaimer, the term of this patent is extended or adjusted under 35 U.S.C. 154(b) by 166 days.

(21) Appl. No.: 16/932,213

(22) Filed: Jul. 17, 2020

(65) Prior Publication Data
US 2021/0058907 A1 Feb. 25, 2021

Related U.S. Application Data

(60) Provisional application No. 62/924,023, filed on Oct. 21, 2019, provisional application No. 62/890,952, filed on Aug. 23, 2019.

(51) Int. Cl.
*H04W 72/23* (2023.01)
*H04L 1/1812* (2023.01)
*H04W 72/21* (2023.01)

(52) U.S. Cl.
CPC ........... *H04W 72/23* (2023.01); *H04L 1/1812* (2013.01); *H04W 72/21* (2023.01)

(58) Field of Classification Search
None
See application file for complete search history.

(56) References Cited

U.S. PATENT DOCUMENTS

2016/0183241 A1* 6/2016 Lee ................... H04W 56/0015
455/425
2019/0037621 A1* 1/2019 Feng .................... H04W 76/14
(Continued)

FOREIGN PATENT DOCUMENTS

| WO | 2019160788 A1 | 8/2019 |
| WO | 2020145780 A1 | 7/2020 |
| WO | 2020151695 A1 | 7/2020 |

OTHER PUBLICATIONS

Ericsson: "Feature Lead Summary #2 on Resource Allocation for NR Sidelink. Mode 1," 3GPP Draft, 3GPP TSG-RAN WG1 Meeting #96bis, R1-1905834—Feature Lead Summary AI 7.2.4.2.1 V2.0, 3rd Generation Partnership Project (3GPP), Mobile Competence Centre, 650, Route Des Lucioles, F-06921, Sophia-Antipolis Cedex, France, vol. RAN WG1. No. Xi'an. China, Apr. 8, 2019-Apr. 12, 2019, Apr. 15, 2019 (Apr. 15, 2019), XP051707881, 23 pages, Retrieved from the Internet: URL: http://www.3gpp.org/ftp/tsg%5Fran/WG1%5FRL1/TSGR1%5F96b/Docs/R1%2D1905834%.
(Continued)

*Primary Examiner* — Srinivasa R Reddivalam
(74) *Attorney, Agent, or Firm* — Sevan Savsa; ArentFox Schiff LLP

(57) ABSTRACT

A first user equipment (UE) is configured to communicate with a second UE in sidelink communications using a sidelink configured grant (CG) configured by a base station. The first UE receives, a radio resource control (RRC) message or physical layer signaling including a sidelink configured grant (CG) configuration indicating at least some parameters configured by a base station for sidelink communications between the first UE and a second UE. The first UE transmits or receives a transport block for the sidelink communications on a physical sidelink shared channel (PSSCH) based on the at least some parameters.

28 Claims, 11 Drawing Sheets

(56) References Cited

U.S. PATENT DOCUMENTS

| | | | | |
|---|---|---|---|---|
| 2019/0342910 A1* | 11/2019 | Cao | ...................... | H04L 5/0053 |
| 2020/0059923 A1* | 2/2020 | Lei | ......................... | H04W 4/70 |
| 2021/0219268 A1* | 7/2021 | Li | ......................... | H04W 72/20 |
| 2021/0321348 A1* | 10/2021 | Ohara | ...................... | H04L 5/14 |
| 2022/0232549 A1* | 7/2022 | Yeo | ...................... | H04L 5/0044 |

OTHER PUBLICATIONS

International Search Report and Written Opinion—PCT/US2020/042805—ISA/EPO—dated Oct. 9, 2020.

* cited by examiner

CONFIGURED GRANTS FOR SIDELINK COMMUNICATIONS

This application claims priority to U.S. Provisional Application No. 62/890,952 titled "CONFIGURED GRANTS FOR SIDELINK COMMUNICATIONS," filed Aug. 23, 2019, and U.S. Provisional Application No. 62/924,023 titled "CONFIGURED GRANTS FOR SIDELINK COMMUNICATIONS," filed Oct. 21, 2019, both of which are assigned to the assignee hereof, and incorporated herein by reference in their entirety.

BACKGROUND

Technical Field

The present disclosure relates generally to communication systems, and more particularly, to sidelink communications utilizing configured grants.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The method may include receiving at a first user equipment (UE), a radio resource control (RRC) message or physical channel control information including a sidelink configured grant (CG) configuration indicating at least some parameters configured by a base station for sidelink communications between the first UE and a second UE. The method may include transmitting or receiving a transport block for the sidelink communications on a physical sidelink shared channel (PSSCH) based on the at least some parameters.

In an aspect, receiving the RRC message includes receiving the RRC message from the base station when connected to the base station or receiving the RRC message from the second UE when not connected to the base station.

In an aspect, wherein receiving the physical channel control information includes receiving a downlink control information (DCI) from the base station when connected to the base station or receiving a sidelink control information (SCI) from the second UE when not connected to the base station.

In an aspect, receiving the RRC message includes receiving the RRC message from a third UE that is connected to the base station when the first UE and the second UE are not connected to the base station.

In an aspect, receiving the physical channel control information includes receiving a sidelink control information (SCI) from a third UE that is connected to the base station when the first UE and the second UE are not connected to the base station.

In an aspect, the method may include transmitting a second RRC message or a sidelink control information (SCI) including the at least some parameters to the second UE when the second UE is not connected to the base station. The second RRC message may include a time domain offset based on a time to transmit the second RRC message, the time domain offset indicating a time when the sidelink CG configuration is available.

In an aspect, the method may include transmitting a grant for semi-persistent scheduling to the second UE.

In an aspect, the method may include receiving physical layer signaling indicating that the sidelink CG configuration is active. In an aspect, the physical layer signaling is a downlink control information (DCI) transmitted by the base station when the first UE is connected to the base station. The DCI may include a radio network temporary identifier (RNTI) for a physical sidelink control channel that shares resources with a physical downlink control channel. The method may further include transmitting an acknowledgment or negative acknowledgment of the DCI on physical uplink control channel (PUCCH) resources indicated by the DCI or the RRC message. Alternatively or additionally, the method may further include relaying at least some parameters of the DCI to the second UE in a sidelink control information (SCI).

In an aspect, the method may include receiving an acknowledgment (ACK) or negative acknowledgment (NACK) of the SCI on a physical sidelink feedback channel resource indicated by the SCI or higher layer signaling. The method may further include forwarding the ACK/NACK of the SCI on physical uplink control channel (PUCCH) resources indicated by the DCI or the RRC message. Alternatively, the method may further include transmitting a media access control (MAC) control element (CE) indicating the acknowledgment or negative acknowledgment of the SCI.

In another aspect, the physical layer signaling is a sidelink control information (SCI) from the second UE when the first UE is not connected to the base station. The SCI may indicate a timing of a transmission/reception opportunity of the sidelink CG configuration. For the second UE, the method may further include receiving an ACK/NACK of the SCI on a physical sidelink feedback channel resource indicated by the SCI or higher layer signaling. Additionally, the method may include forwarding the ACK/NACK of the SCI on physical uplink control channel (PUCCH) resources indicated by the DCI or the RRC message. Alternatively, method may include transmitting a media access control (MAC) control element (CE) indicating the ACK/NACK of the SCI.

In another aspect, the physical layer signaling is a sidelink control information (SCI) or physical sidelink feedback channel (PSFCH) message from a third UE when the first UE and the second UE are not connected to the base station.

Where the physical layer signaling is an SCI, the method may further include transmitting an acknowledgment or negative acknowledgment of the SCI or the PSFCH message on physical sidelink feedback channel (PSFCH) resources indicated by the SCI or the RRC message.

In an aspect, the method may further include determining whether to retransmit the transport block based on expiration of a time period started in response to transmitting the transport block. Determining whether to retransmit may include determining to retransmit in response to receiving a negative acknowledgment from the second UE or receiving a retransmission grant from the base station within the time period.

In an aspect, the method may further include: determining whether the transport block was successfully received at the first UE; transmitting an acknowledgment or negative acknowledgment to a base station on a physical uplink control channel on resources indicated by an RRC configuration if connected to the base station; and transmitting the acknowledgment or negative acknowledgment to the second UE on a physical sidelink feedback channel on resources indicated by an RRC configuration. In an aspect, the resources for the ACK/NACK of a first occasion of the sidelink CG configuration on one or both of the PUCCH and PSFCH are indicated by physical layer signaling and the RRC configuration indicates the resource for the acknowledgment or negative acknowledgment of subsequent occasions.

In another aspect, the disclosure includes an apparatus for wireless communication. The apparatus may include a memory and at least one processor coupled to the memory. The processor may be configured to receive at a first UE, a RRC message including a sidelink CG configuration indicating at least some parameters configured by a base station for sidelink communications between the first UE and a second UE. The processor may be configured to transmit or receive a transport block for the sidelink communications on a PSSCH based on the at least some parameters.

In another aspect, the disclosure includes an apparatus for wireless communication. The apparatus may include means for receiving at a first UE, a RRC message including a sidelink CG configuration indicating at least some parameters configured by a base station for sidelink communications between the first UE and a second UE. The apparatus may include means for transmitting or means for receiving a transport block for the sidelink communications on a PSSCH based on the at least some parameters.

In another aspect, the disclosure provides non-transitory computer-readable medium storing computer executable code. The code when executed by a processor causes the processor to receive at a first user equipment (UE), a radio resource control (RRC) message including a sidelink configured grant (CG) configuration indicating at least some parameters configured by a base station for sidelink communications between the first UE and a second UE. The code when executed by a processor causes the processor to transmit or receive a transport block for the sidelink communications on a physical sidelink shared channel (PSSCH) based on the at least some parameters.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
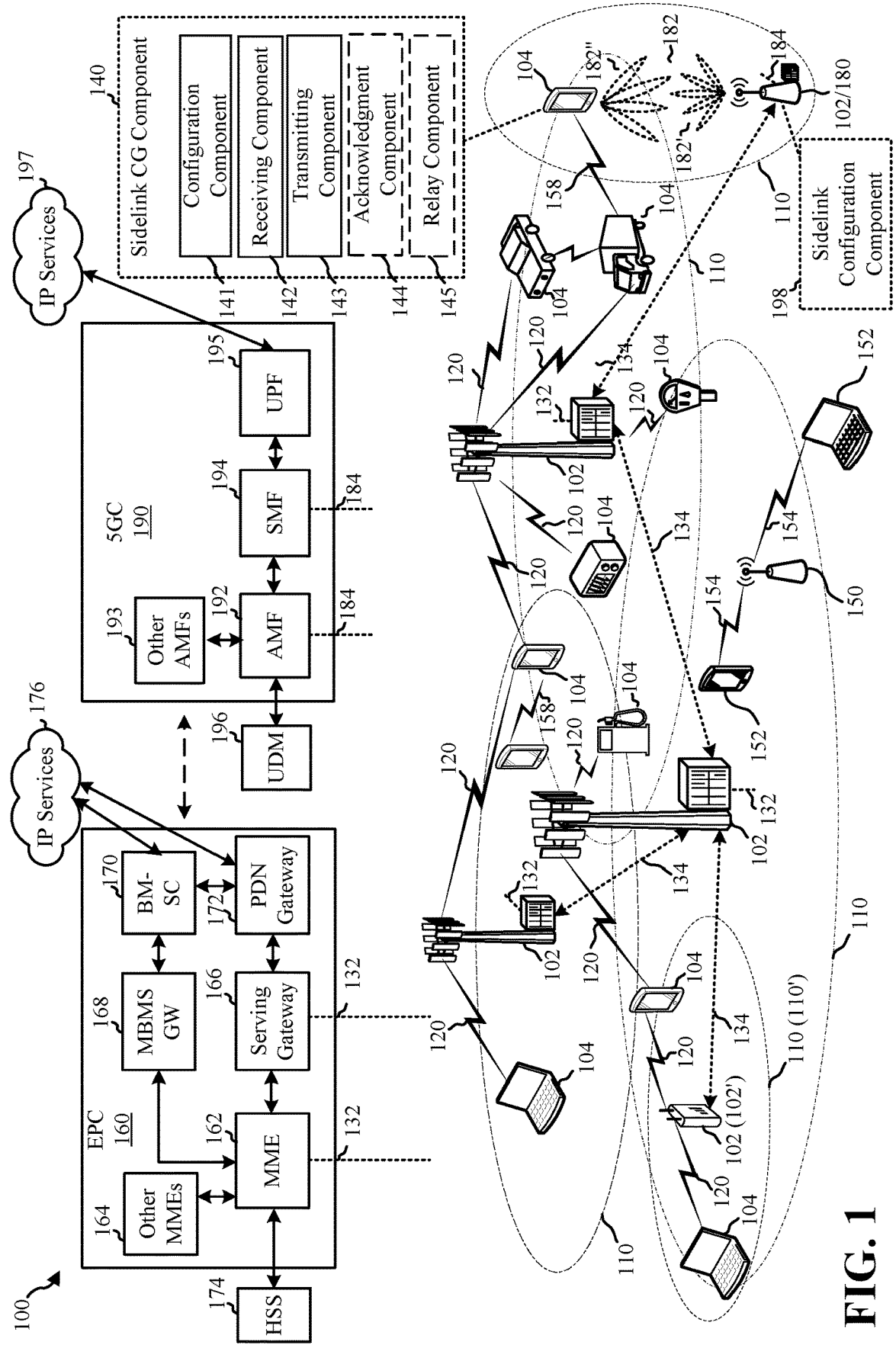
FIG. 1 is a diagram illustrating an example of a wireless communications system and an access network, in accordance with certain aspects of the present description.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts. Although the following description may be focused on 5G NR, the concepts described herein may be applicable to other similar areas, such as LTE, LTE-A, CDMA, GSM, and other wireless technologies.

A sidelink communication may refer to a wireless transmission from one user equipment (UE) to another UE. In 5G NR, sidelink communications may share time and frequency domain resources with communications between a UE and a base station. A base station (e.g., a gNB) may provide a grant for sidelink communications. A dynamic grant may provide resources for one or multiple sidelink transmissions of a single transport block (TB). A configured grant (CG) may provide a set of resources in a periodic manner for multiple sidelink transmissions. A CG may be a type-1 grant where all parameters are configured via radio resource control (RRC) messaging and ready to use after configuration with no layer 1 (L1) involvement. Alternatively, a CG may be a type-2 grant where some parameters are indicated via downlink control information (DCI) activation and the rest of the parameters are configured RRC via RRC messages.

A UE may determine which TB to transmit in each of the occasions indicated by a given configured grant. Conventional 5G NR sidelink does not support performing different transmissions of a TB using different configured grants. Other restrictions on what can be transmitted in a given configured grant (e.g., based on quality of service (QoS), destination UE, etc.) may also be implemented.

A sidelink hybrid automatic repeat request (HARQ) acknowledgment (ACK) or negative acknowledgment (NACK) (ACK/NACK) report from a receiving UE to a base station may be allowed. That is, rather than reporting a received status of the TB to the UE that transmitted the TB, a receiving UE may report the received status (e.g., ACK or NACK) to the base station via an uplink transmission. In the case of uplink ACK/NACK of a sidelink TB, the UE may use an uplink grant to transmit the ACK/NACK. Scheduling requests (SR) or buffer status report (BSR) report to the base station for the purpose of requesting resources for HARQ retransmission may not be supported Wireless communications involving a vehicle (e.g., vehicle to anything (V2X) may include at least the following two sidelink (SL) resource allocation modes. In mode 1, the base station schedules sidelink resources to be used by the UE for sidelink transmissions. For example, a dynamic grant by the base station may provide resources for transmission of a physical sidelink control channel (PSCCH) and a physical sidelink shared channel (PSSCH).

In mode 2, the UE determines (i.e., base station does not schedule) sidelink transmission resources within sidelink resources configured by the BS or the network, or from pre-configured SL resources. For instance, in mode 2, sidelink resource allocation may include: a) UE autonomously selects SL resource for transmission; b) UE assists SL resource selection for other UE(s); c) UE is configured with NR configured grant (Type-1 like) for SL transmission; and d) UE schedules SL transmissions of other UEs.

Sidelink communications may face unique challenges when using CG (e.g., compared to uplink CG) due to possible configurations and connection statuses. For example, in mode 1 communications, a UE that is not currently connected to a base station (e.g., out of range) may not receive transmission parameters for sidelink CG. As another example, although uplink ACK/NACK of sidelink transmissions may be allowed, in 5G NR there may be no mechanism for explicit acknowledgment of uplink transmissions utilizing configured grants.

Instead, the UE may utilize a timer and assume that the transmission was successful if no additional grant for a retransmission is received before the timer expires. Such a mechanism may not be applicable to sidelink CG. As another example, type 2 uplink CG may utilize a media access control (MAC) control element (CE) (MAC-CE) to indicate activation or release of the CG. For sidelink communications, MAC-CE may require an additional grant and may increase latency.

The present disclosure provides mechanisms for UEs to utilize configured grants for sidelink communications. A first UE may receive a radio resource control (RRC) message including a sidelink configured grant (CG) configuration indicating at least some parameters configured by a base station for sidelink communications between the first UE and a second UE. The first UE may transmit or receive a transport block for the sidelink communications on a PSSCH based on the at least some parameters.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media, which may also be referred to as a non-transitory computer-readable medium. The term non-transitory computer-readable medium excludes transitory signals. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network (e.g., a 5G Core (5GC) 190). The base stations 102 may include macrocells (high power cellular base station) and/or small cells (low power cellular base station). The macrocells include base stations. The small cells include femtocells, picocells, and microcells.

One or more of the UEs 104 may include a sidelink CG component 140 that utilizes a configured grant for sidelink communications. The sidelink CG component 140 may include a configuration component 141 that receives CG configurations from a base station (e.g., base station 102) or another UE 104, a receiving component 142 that receives a sidelink TB based on the CG configuration, and a transmitting component 143 that transmits a sidelink TB based on the CG configuration. The sidelink CG component 140 may optionally include an acknowledgment component 144 that transmits an acknowledgment (e.g., ACK or NACK) of a received sidelink TB and a relay component 145 that relays one or more messages (e.g., RRC configuration or downlink control information (DCI)) to another UE. In an aspect, the base station 102 may include a sidelink configuration component 198 that performs the actions of the base station as described herein (e.g., transmitting the sidelink CG configuration to one or more UEs).

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., Si interface). The backhaul links 132 may be wired or wireless. The base stations 102 configured for 5G NR (collectively referred to as Next Generation RAN (NG-RAN)) may interface with 5GC 190 through backhaul links 184. The backhaul links 184 may be wired or wireless. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and a physical sidelink feedback channel (PSFCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in one or more frequency bands within the electromagnetic spectrum.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW radio frequency band have extremely high path loss and a short range. The mmW base station 180 may utilize beamforming 182 with the UE 104 to compensate for the path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the 5GC 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
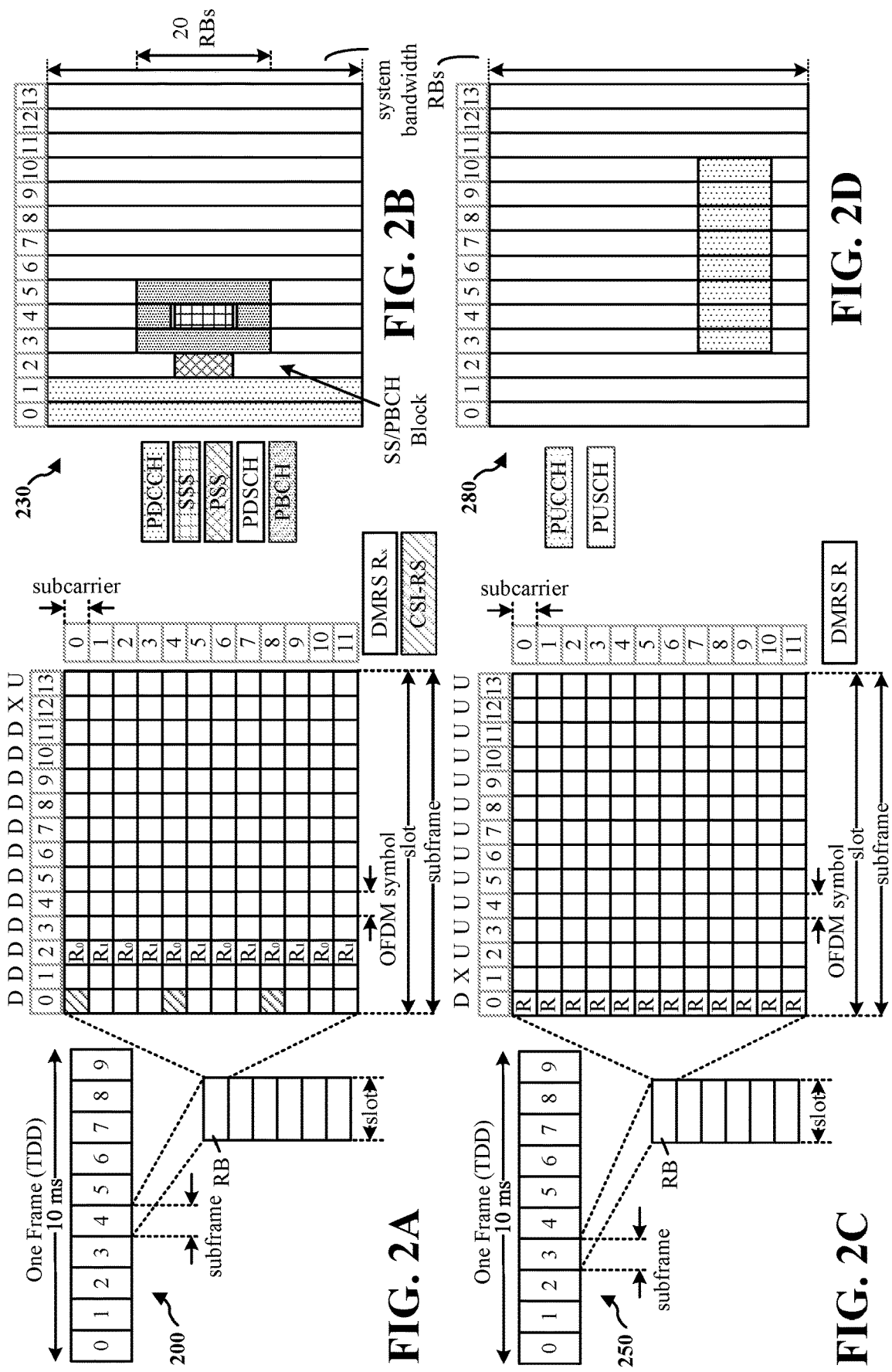
FIG. 2A is a diagram illustrating an example of a first frame, in accordance with certain aspects of the present description.
FIG. 2B is a diagram illustrating an example of DL channels within a subframe, in accordance with certain aspects of the present description.
FIG. 2C is a diagram illustrating an example of a second frame, in accordance with certain aspects of the present description.
FIG. 2D is a diagram illustrating an example of a subframe, in accordance with certain aspects of the present description.

FIGS. 2A-2D are resource diagrams illustrating example frame structures and channels that may be used for uplink, downlink, and sidelink transmissions to a UE 104 including a sidelink CG component 140. FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=0$ with 1 slot per subframe. The subcarrier spacing is 15 kHz and symbol duration is approximately 66.7 $\mu$s.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIGs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
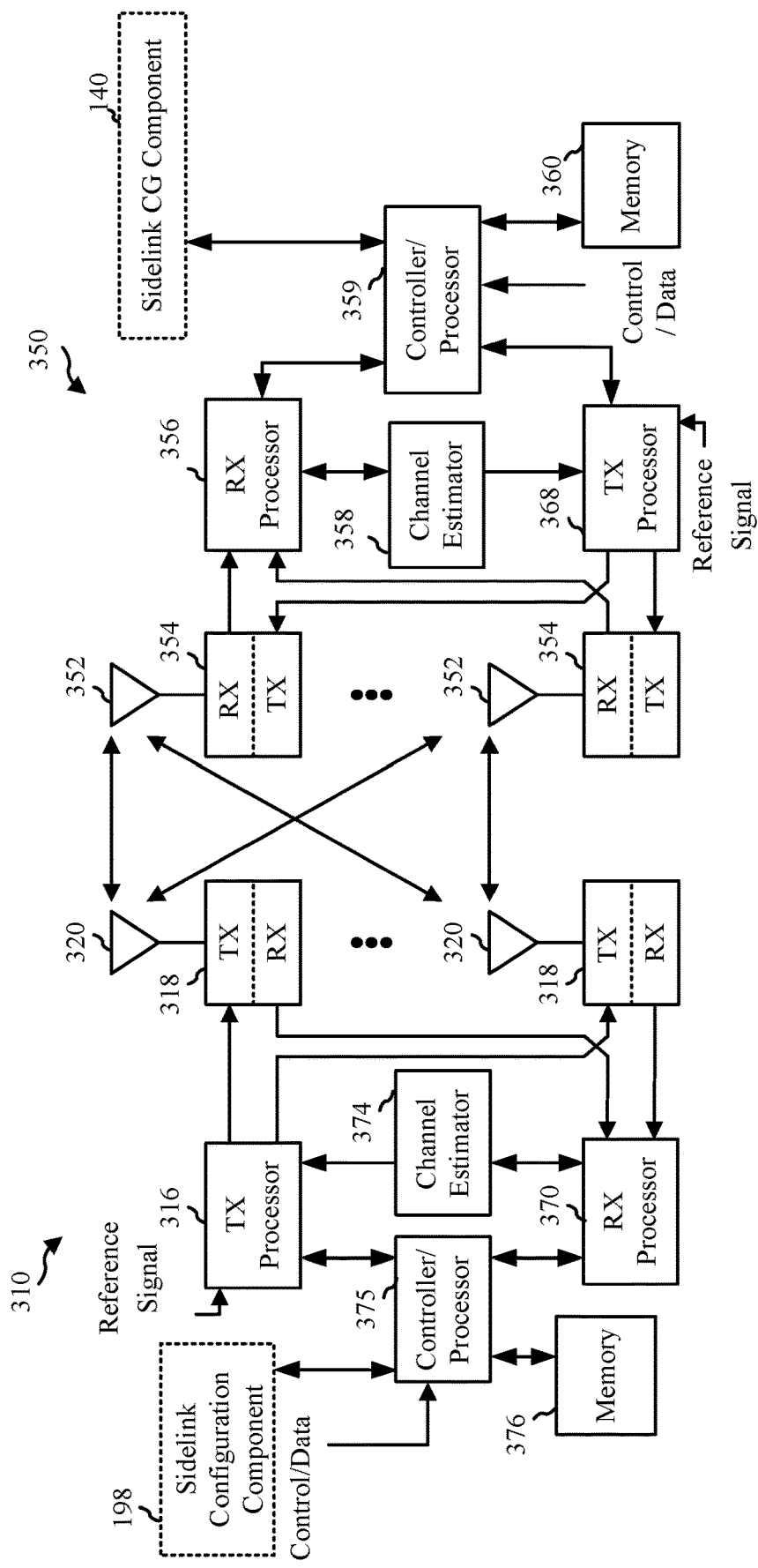
FIG. 3 is a diagram illustrating an example of a base station and user equipment (UE) in an access network, in accordance with certain aspects of the present description.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIGs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC)

coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160 or 5GC 190. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

As described in further detail below, the UE 350 may communicate with another UE 350 instead of the base station 310 using sidelink communications.

At least one of the TX processor 368, the RX processor 356, and the controller/processor 359 may be configured to perform aspects in connection with the sidelink CG component 140 of FIG. 1.

At least one of the TX processor 316, the RX processor 370, and the controller/processor 375 may be configured to perform aspects in connection with the sidelink configuration component 198 of FIG. 1.

Figure 4:
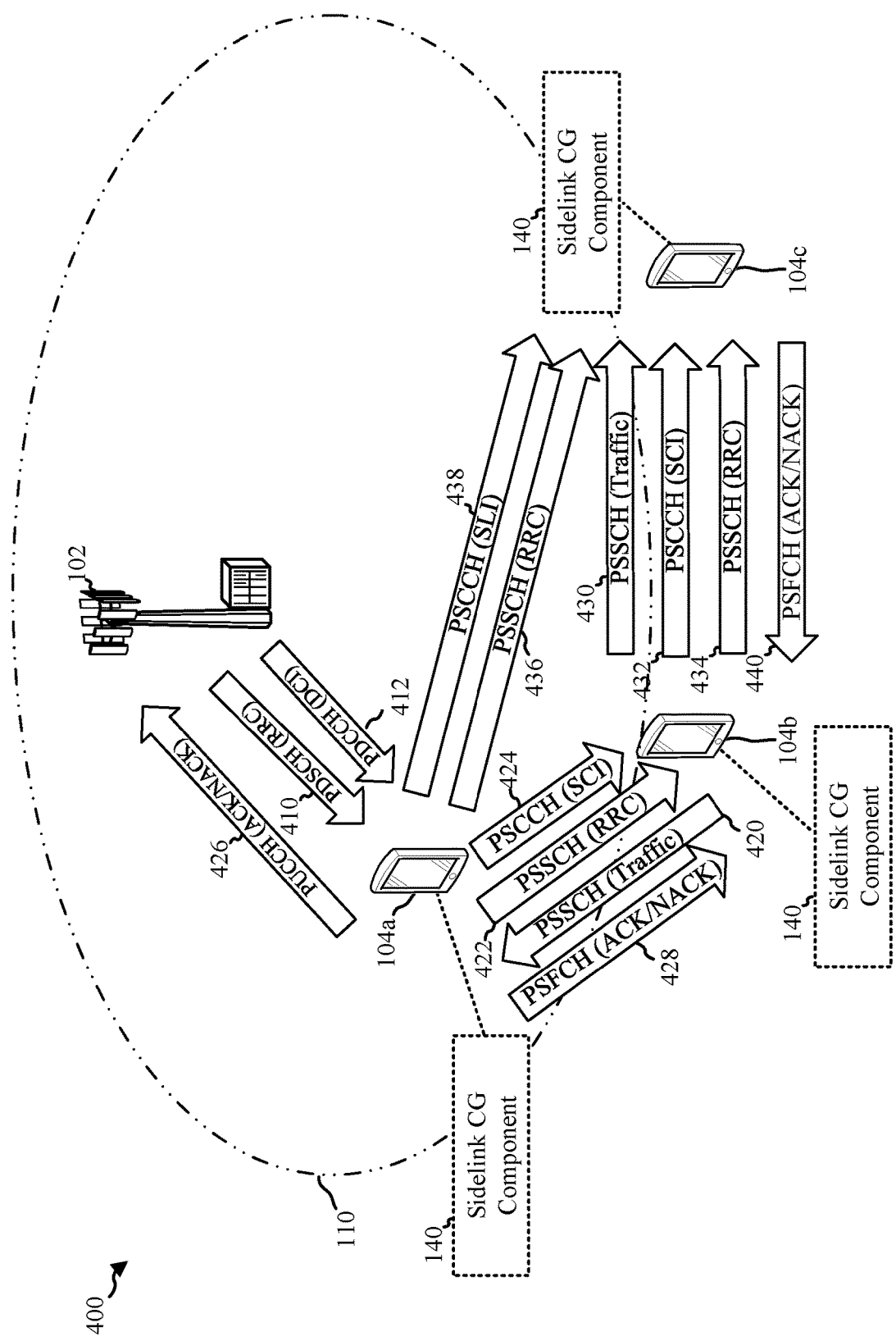
FIG. 4 is a schematic diagram illustrating an example configuration for a serving cell and UEs communicating via a sidelink channel, in accordance with certain aspects of the present description.

FIG. 4 is an example scenario for sidelink communications between UEs 104 based on a CG from a base station 102. Each of the UEs 104 may be an example of the UE 104 and may include a sidelink CG component 140. Some of the UEs 104 may be within the coverage area 110 of the base station 102, while others of the UEs 104 may be outside of the coverage area 110 of the base station 102. For example, the UE 104a may be within the coverage area 110 of the base station 102 and the UEs 104b and 104c may be outside of the coverage area 110 of the base station 102. The UEs 104b and 104c may not have a direct connection to the base station 102.

Sidelink communications may occur among the UEs 104. As discussed above, mode 1 communications may be scheduled by a base station (e.g., base station 102) using a CG. The delivery of the CG, activation of the CG, and/or delivery of parameters in a DCI may be complicated for cases where one or more of the UEs do not have a connection to the base station 102 (e.g., UEs 104b and 104c that are out of coverage area 110). In an aspect, the UE 104a that is connected to the base station 102 may facilitate sidelink communications using CG.

The base station 102 may configure one or more of the UEs 104 with a CG by transmitting a CG configuration via an RRC message. For example, the base station 102 may transmit a PDSCH 410 carrying the RRC message to the UE 104a that is connected to the base station. The RRC message may carry either a type-1 or type-2 sidelink CG configuration. For a type-1 sidelink configuration, the CG configuration may include all of the parameters for a sidelink communication. For a type-2 sidelink configuration, the CG configuration may include at least some of the parameters for a sidelink communication, with the remaining parameters to be delivered via DCI.

If the UE 104 is in coverage (e.g., the UE 104a), the transmission/reception CG parameters may be directly indicated through the DL RRC configuration on PDSCH 410 from the base station 102. For type-2 CG, the base station 102 may also transmit the PDCCH 412 with a DCI indicating activation of the CG configuration. The DCI may also include any remaining parameters that were not included in the RRC configuration on PDSCH 410. When the sidelink and the downlink are shared channels (e.g., same frequency domain resources), the UE 104a may be configured with a sidelink radio network temporary identifier (RNTI) that is different than a downlink RNTI such that the UE 104a may distinguish the DCI for sidelink CG activation.

If the UE 104 (e.g., UE 104b) is out of coverage and the UE 104b is the transmitting UE, the transmit CG parameters may be indicated by the receiving UE (e.g., UE 104a) through a SL RRC configuration. For example, for a sidelink communication on a PSSCH 420, the UE 104b may be the transmitting UE and may receive the PSSCH 422 including an RRC message with the transmit CG parameters. The RRC message may be based on the RRC message of the PDSCH 410. That is, the base station 102 may configure the UE 104a with the receive CG parameters and may include the transmit CG parameters in the PDSCH 410, or the UE 104a may derive the transmit CG parameters from the received CG parameters. In either case, the UE 104a may send the transmit CG parameters to the UE 104b in the RRC message on the PSSCH 422. The PSSCH 422 may be scheduled by a grant other than the CG (e.g., a dynamic grant or an existing CG). For type-1 CG, the RRC message may include a time domain offset parameter that indicates a difference from a system frame number (SFN) 0 for the transmission occasion configured by the CG configuration. The time domain offset may take into account a time needed for the SL RRC configuration. That is, the base station 102 may select a time domain offset that allows enough time for the UE 104a to send the PSSCH 422. Alternatively, the UE 104a may update the SFN to indicate the next available transmission occasion (e.g., if the time domain offset in the PDSCH 410 indicates a transmission occasion that would pass before the PSSCH 422 is received) to maintain the timing of the configuration from the base station. For type-2 CG, the UE 104b may receive an activation sidelink control information (SCI) from the UE 104a on the PSCCH 424. The SCI may include any remaining parameters that were not included in the RRC configuration. For example, the SCI may include timing information. When relaying the timing information in the SCI, the UE 104a may ensure that the SFN, slot, and symbol of the first transmission/reception opportunity of the CG is not shifted as originally indicated by the DCI (e.g., DCI in PDCCH 412). For example, the UE 104a may adjust the timing based on the time of transmission of the SLI. Alternatively, only the symbol of the first transmission/reception occasion of the CG needs to be maintained with the configuration from the base station 102.

If the UE 104 (e.g., UE 104c) is out of coverage and the UE 104c is the receiving UE, the receive CG parameters may be indicated by the transmitting UE (e.g., UE 104b) through a SL RRC configuration. For example, for a SL communication on a PSSCH 430 from the UE 104b to the UE 104c, the UE 104b may transmit the PSSCH 434 including an RRC message with the receive CG parameters. The reception parameters may be provided to the UE 104b via the RRC message of the PSSCH 422 or derived by the UE 104b from the transmit CG parameters. In another aspect, the UE 104c may receive the receive CG parameters from a third UE that is not involved in the sidelink communication on PSSCH 430. For example, the UE 104a may transmit an RRC message to the UE 104c via the PSSCH 436. For type-2 CG, the UE 104c may receive an activation SCI from the UE 104b on the PSCCH 432 or from the UE 104a on the PSCCH 438. The SCI may include any remaining parameters that were not included in the RRC configuration. For example, the SCI may include timing information. When relaying the timing information in the SCI, the UE 104b may ensure that the SFN, slot, and symbol of the first transmission/reception opportunity of the CG is not shifted as originally indicated by the DCI (e.g., DCI in PDCCH 412). For example, the UE 104b may adjust the timing based on the time of transmission of the SLI. Alternatively, only the symbol of the first transmission/reception occasion of the CG needs to be maintained with the configuration from the base station 102.

In an aspect, a UE 104a that is connected to the base station 102 may transmit an ACK/NACK for a sidelink communication on a PSSCH 420 to the UE 104b that transmitted the PSSCH 420, or to the base station 102. For example, the UE 104a may transmit the ACK/NACK on a PUCCH 426 to the base station 102 and/or the UE 104a may transmit the ACK/NACK on a PSFCH 428. The UE 104b that transmitted the PSSCH 420 may determine whether to retransmit.

In a first option, the UE 104b may determine to retransmit when the UE 104b does not receive a NACK on the PSFCH 428 from the UE 104a and/or the UE 104b does not receive a retransmission grant from the base station 102 within a time period. For example, the UE 104b may start a timer to measure the time period when transmitting the PSSCH 420 and determine to retransmit if the UE 104b does not receive NACK or a retransmission grant before the timer expires.

In a second option, the UE 104a may always provide either an ACK or a NACK to the transmitting UE 104b through PSFCH 428 and to the base station 102 through PUCCH 426 if connected to the base station 102. The PUCCH resource and/or the PSFCH resource may be configured in the CG configuration received via RRC.

For type-2 CG configurations, the UE 104 may confirm a DCI or SLI activating or deactivating the CG configuration. For CG for uplink communications, a MAC-CE is used for such confirmation, but for mode 1 communications such a MAC-CE would need to be scheduled, which may introduce additional latency. In an aspect, a UE 104 may confirm the DCI or SCI activating or deactivating the CG configuration to the node that sent the DCI or SCI. In a first option, if the UE 104 (e.g., UE 104a) receives the PDCCH 412 including DCI, the UE 104a may confirm the DCI as an ACK/NACK on the PUCCH 426 using resources indicated in the DCI. Alternatively, the PUCCH resource may be RRC configured by the base station 102. In a second option, if the UE 104

(e.g., UE 104b) receives the SCI from another UE (e.g., UE 104a), the UE 104b may provide the configuration as an ACK/NACK on the PSFCH 428 using resources indicated by the SCI. Alternatively, the PSFCH resource may be RRC configured.

Figure 5A:
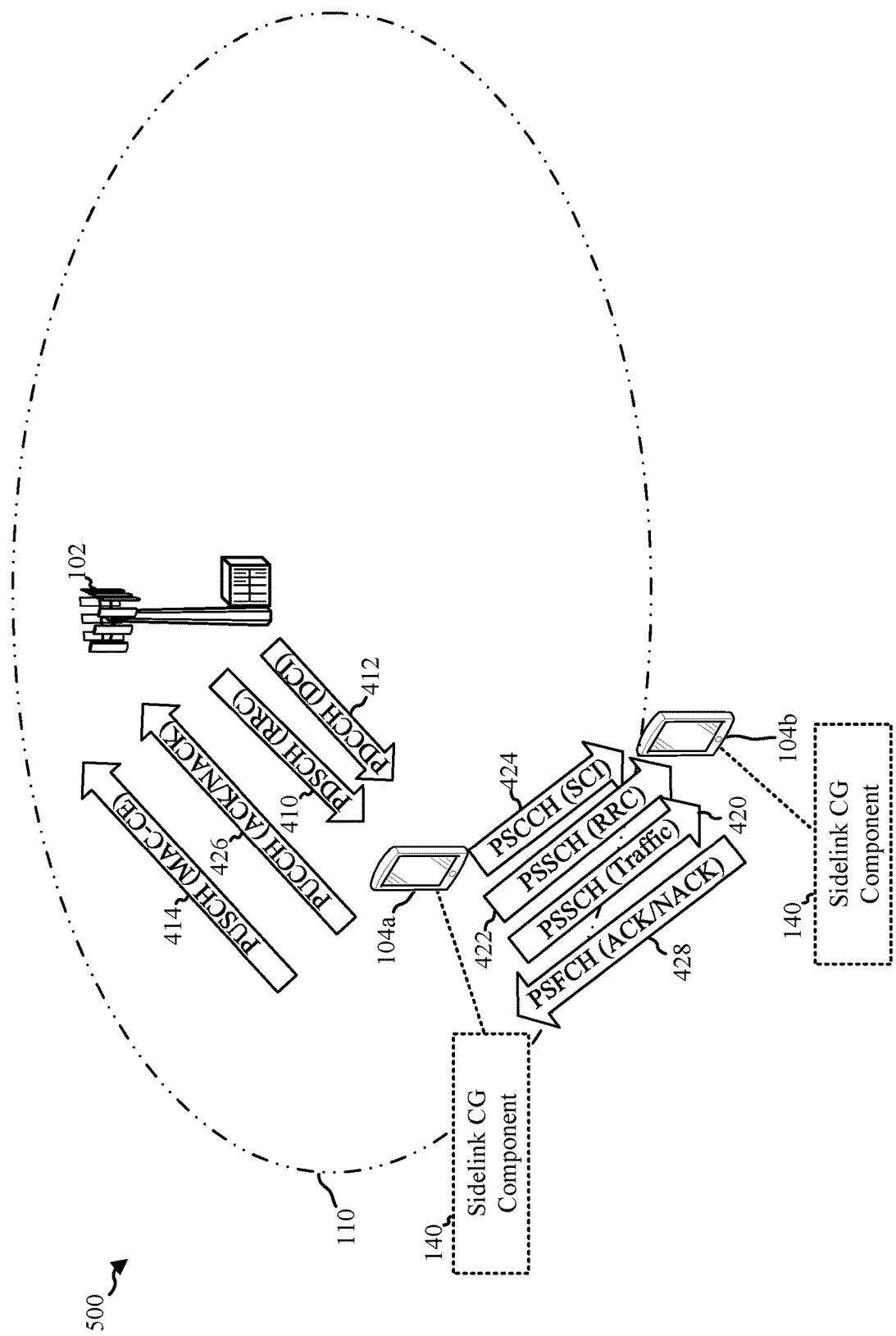
FIG. 5A is a schematic diagram illustrating an example configuration for a serving cell, a transmitting UE connected to the serving cell, and a receiving UE, in accordance with certain aspects of the present description.

Turning to FIG. 5A, an example scenario 500 illustrates example signaling where the UE 104a is a sidelink transmitting UE within coverage of the base station 102 and the UE 104b is a sidelink receiving UE out of coverage of the base station 102. The UE 104a may receive one or both of an RRC message on the PDSCH 410 or a DCI on the PDCCH 412 including a sidelink CG configuration indicating at least some parameters for sidelink communication with the UE 104b. Since the UE 104b is out of coverage of the base station 102, the UE 104b cannot receive the parameters directly from the base station 102. The UE 104a may transmit one or both of an RRC message on the PSSCH 422 or an SCI on the PSCCH 424 including the at least some parameters for sidelink communication. In an aspect, the SCI on the PSCCH 424 may utilize a specific SCI format for configuring the sidelink CG configuration. For example, the specific SCI format may have a different length than other defined SCI formats and may be detected via blind decoding. The specific SCI format may include a field for a periodicity of the sidelink CG configuration. In another aspect, the UE 104a may transmit a grant for semi-persistent scheduling (SPS) to the second UE 104b. The grant for SPS to the second UE may be based on the sidelink CG configuration (e.g., by converting transmit parameters to receive parameters). Where the sidelink CG configuration is communicated using an activation DCI (e.g., Type 2 CG configuration), the SCI on the PSCCH 424 may be an activation SCI indicating a sidelink CG configuration to activate. The UE 104b may provide an ACK/NACK of the SCI on the PSFCH 428. The specific resources on the PSFCH 428 may be indicated by the activation SCI or by higher layer (e.g., RRC) configuration. The UE 104a may forward the ACK/NAK to the base station 102 on PUCCH 426. The specific PUCCH resources may be indicated by the activation DCI or RRC configuration. In another aspect, the UE 104a may transmit a MAC-CE carrying the forwarded ACK/NAK on the PUSCH 414 The UE 104a may transmit the sidelink traffic according to the sidelink CG configuration on the PSSCH 420. In this example, because the UE 104b is out of coverage of the base station 102, any ACK/NAK may be through the UE 104a. In a first implementation, the UE 104a may start a timer when transmitting the PSSCH 420. The UE 104b may transmit NAK on the PSFCH 428 if the PSSCH 420 is not received according to the sidelink CG configuration. If the timer expires before the UE 104a receives the NAK, the UE 104a may assume the PSSCH 420 was received. In a second implementation, the UE 104b may transmit an ACK/NAK to the UE 104a depending on whether the PSSCH 420 is correctly received.

Figure 5B:
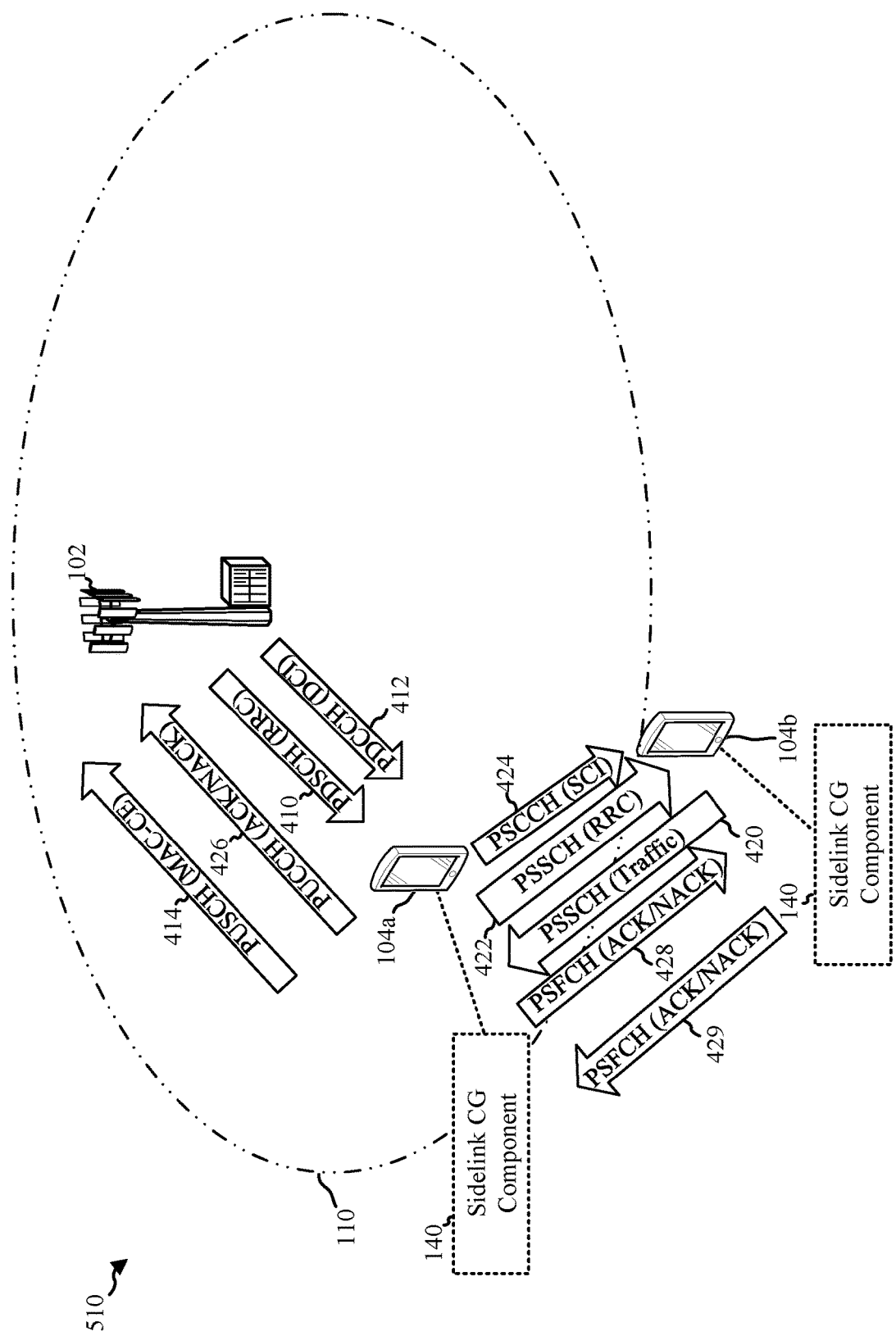
FIG. 5B is a schematic diagram illustrating an example configuration for a serving cell, a receiving UE connected to the serving cell, and a transmitting UE, in accordance with certain aspects of the present description.

Turning to FIG. 5B, an example scenario 510 illustrates example signaling where the UE 104a is a sidelink receiving UE within coverage of the base station 102 and the UE 104b is a sidelink transmitting UE out of coverage of the base station 102. The UE 104a may receive one or both of an RRC message on the PDSCH 410 or a DCI on the PDCCH 412 including a sidelink CG configuration indicating at least some parameters for sidelink communication with the UE 104b. Since the UE 104b is out of coverage of the base station 102, the UE 104b cannot receive the parameters directly from the base station 102. The UE 104a may transmit one or both of an RRC message on the PSSCH 422 or an SCI on the PSCCH 424 including the at least some parameters for sidelink communication. In an aspect, the SCI on the PSCCH 424 may utilize the specific SCI format for configuring the sidelink CG configuration. For example, the specific SCI format may include a field for a periodicity of the sidelink CG configuration. Where the sidelink CG configuration is communicated using an activation DCI (e.g., type 2 CG configuration), the SCI on the PSCCH 424 may be an activation SCI indicating a sidelink CG configuration to activate. Alternatively, the UE 104a may transmit the CG activation on the PSFCH 428. The UE 104b may provide an ACK/NAK of the CG activation on the PSSCH 420. Alternatively, the UE 104b may provide an ACK/NAK of the SCI carrying the CG activation on the PSFCH 429. The specific resources on the PSFCH 429 may be indicated by the activation SCI or by higher layer (e.g., RRC) configuration. The UE 104a may forward the ACK/NAK to the base station 102 on PUCCH 426. The specific PUCCH resources may be indicated by the activation DCI or RRC configuration. In another aspect, the UE 104a may transmit a MAC-CE carrying the forwarded ACK/NAK on the PUSCH 414 The UE 104b may transmit the sidelink traffic according to the sidelink CG configuration on the PSSCH 420. In this example, because the UE 104a (i.e., the sidelink receiving UE) is in coverage of the base station 102, the ACK/NAK may be directly to the base station 102. For example, the UE 104a may transmit the ACK/NAK on the PUCCH 426 to the base station 102. In an implementation, the UE 104a may also transmit the ACK/NAK to the UE 104b on the PSFCH 428.

Figure 5C:
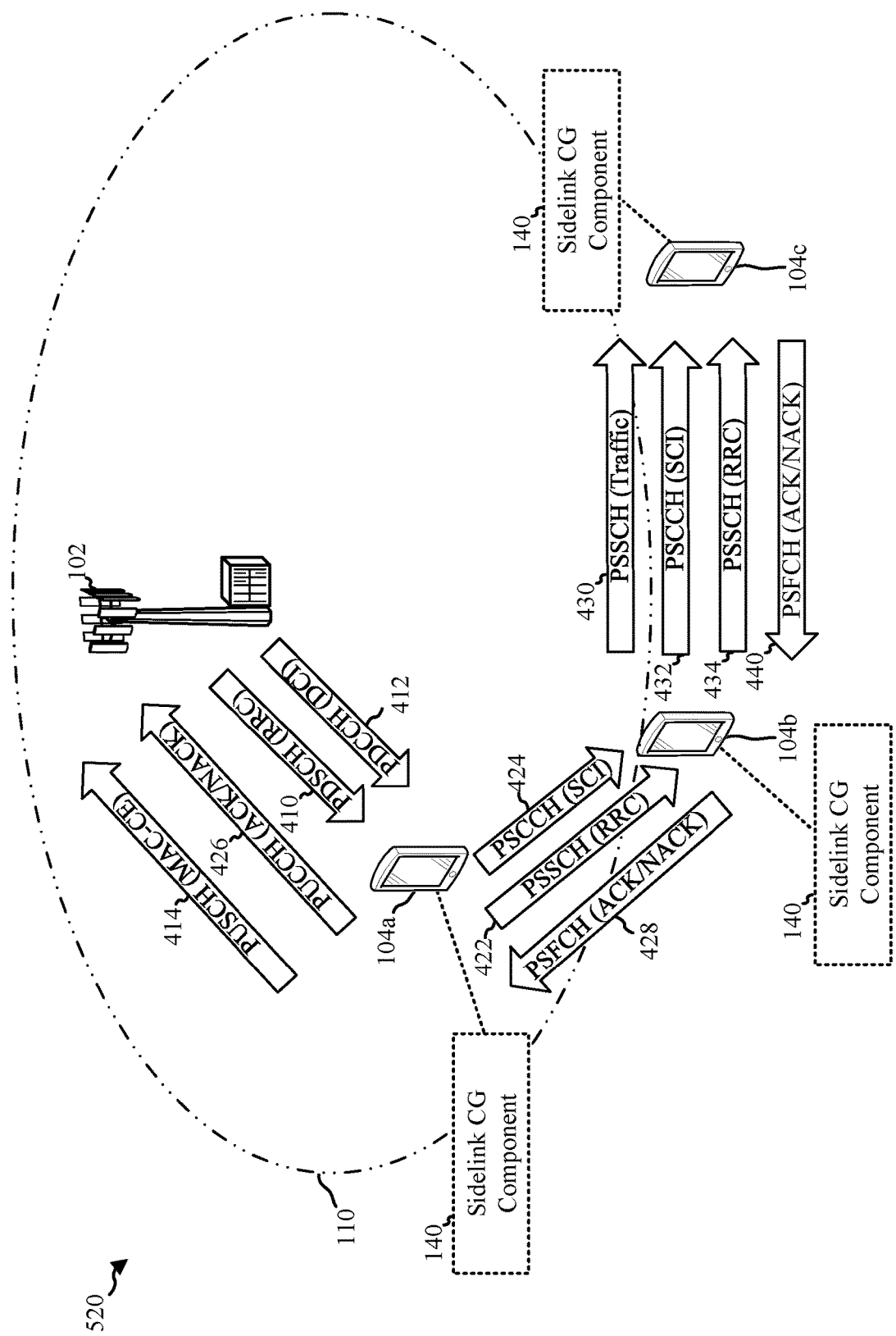
FIG. 5C is a schematic diagram illustrating an example configuration for a serving cell, a relay UE connected to the serving cell, a transmitting UE, and a receiving UE, in accordance with certain aspects of the present description.

Turning to FIG. 5C, an example scenario 520 illustrates example signaling where the UE 104a is relay UE within coverage of the base station 102, the UE 104b is a sidelink transmitting UE out of coverage of the base station 102, and the UE 104c is a sidelink receiving UE out of coverage of the base station 102. The UE 104a may receive one or both of an RRC message on the PDSCH 410 or a DCI on the PDCCH 412 including a sidelink CG configuration indicating at least some parameters for sidelink communication between the UE 104b and the UE 104c. Since the UE 104b and the UE 104c are out of coverage of the base station 102, the UE 104b and the UE 104c cannot receive the parameters directly from the base station 102. The UE 104a may transmit one or both of an RRC message on the PSSCH 422 or an SCI on the PSCCH 424 including the at least some parameters for the sidelink communication. In an aspect, the SCI on the PSCCH 424 may utilize a new SCI format for configuring the sidelink CG configuration. For example, the new SCI format may include a field for a periodicity of the sidelink CG configuration. Similarly, the UE 104b may forward the at least some parameters to the UE 104c by transmitting one or both of an RRC message on the PSSCH 434 or an SCI on the PSCCH 432 including the at least some parameters for the sidelink communication. Where the sidelink CG configuration is communicated using an activation DCI (e.g., type 2 CG configuration), the SCI on the PSCCH 424 may be an activation SCI indicating a sidelink CG configuration to activate. The UE 104b may provide an ACK/NAK of the SCI carrying the CG activation on the PSFCH 428. The specific resources on the PSFCH 428 may be indicated by the activation SCI or by higher layer (e.g., RRC) configuration. The UE 104a may forward the ACK/NAK to the base station 102 on PUCCH 426. The specific PUCCH resources may be indicated by the activation DCI or RRC configuration. In another aspect, the UE 104a may transmit a MAC-CE carrying the forwarded ACK/NAK on the PUSCH 414 The UE 104b may transmit the sidelink traffic to the UE 104c according to the sidelink CG configuration on the PSSCH 430. In this example, because the UE 104c is out of coverage of the base station 102, any ACK/NAK may be through the UE 104b and the UE 104a. In a first implementation, the UE 104b may start a timer when transmitting the PSSCH 430. The UE 104c may transmit NAK on the PSFCH 440 if the PSSCH 430 is not received according to the sidelink CG configuration. If the timer expires before the UE 104b receives the NAK, the UE 104b may assume the PSSCH 430 was received. In a second implementation, the UE 104c may transmit an ACK/NAK to the UE 104b on the PSFCH 440 depending on whether the PSSCH 430 is correctly received.

Figure 6:
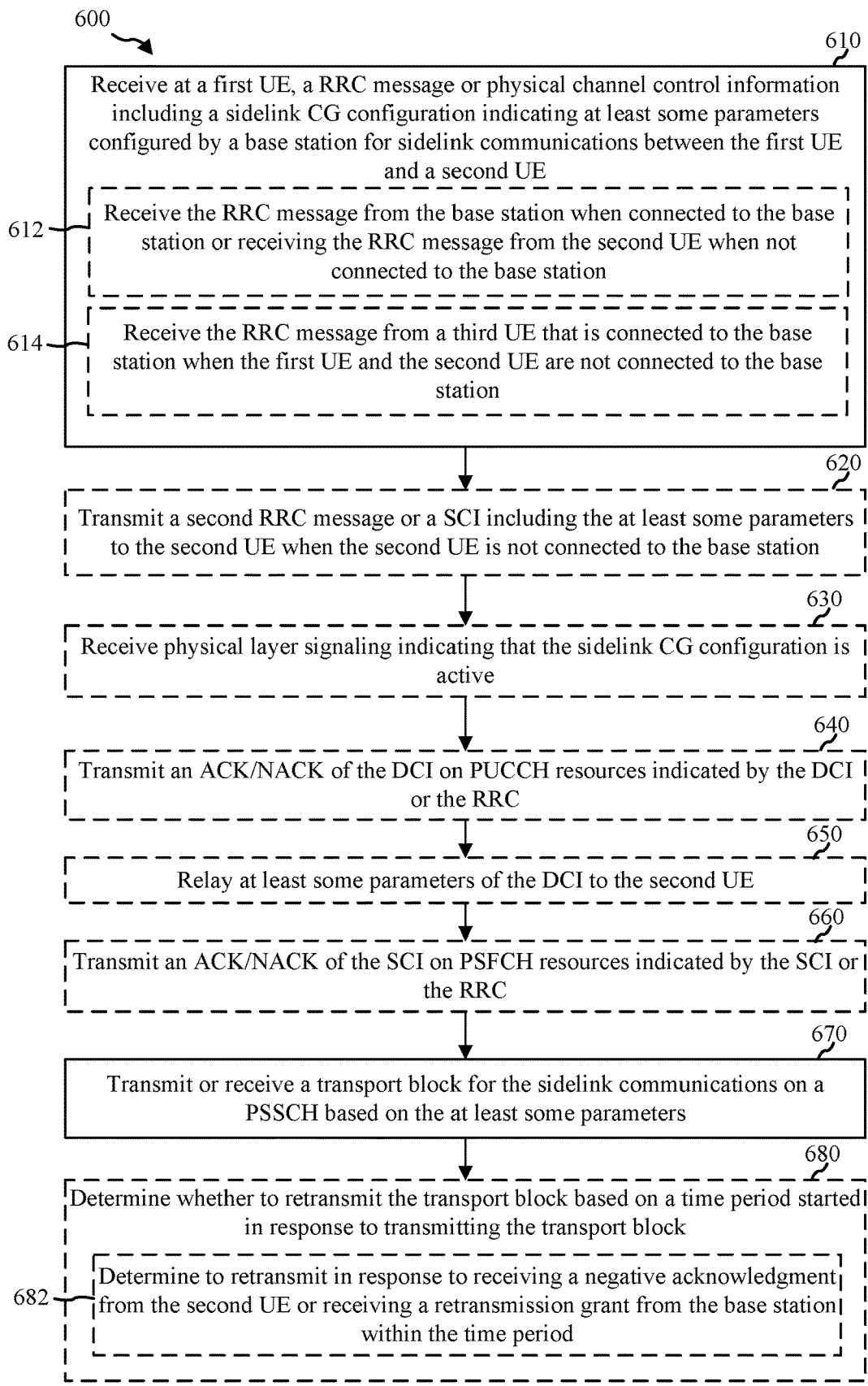
FIG. 6 is a flowchart of an example method of sidelink communication according to a configured grant, in accordance with certain aspects of the present description.

FIG. 6 is a flowchart of a method 600 of wireless communication that may be performed by a UE (e.g., the UE 104, which may include the memory 360 and which may be the entire UE 104 or a component of the UE 104 such as the sidelink CG component 140, TX processor 368, the RX processor 356, and/or the controller/processor 359) for receiving and/or transmitting sidelink communications using a CG. The method 600 may be performed in communication with a base station 102 including the sidelink configuration component 198. Optional blocks are shown with dashed lines.

At block 610, the method 600 may include receiving at a first UE, a RRC message or physical channel control information including a sidelink CG configuration indicating at least some parameters configured by a base station for sidelink communications between the first UE and a second UE. In an aspect, for example, the UE 104, the TX processor 368, the RX processor 356, and/or the controller/processor 359 may execute the sidelink CG component 140 and/or the configuration component 141 to receive at a first UE (e.g., UE 104a or UE 104b), a RRC message including a sidelink CG configuration indicating at least some parameters configured by the base station 102 for sidelink communications between the first UE and a second UE (e.g., the other of UE 104a or UE 104b). Accordingly, the UE 104, the TX processor 368, the RX processor 356, and/or the controller/processor 359 executing the sidelink CG component 140 and/or the configuration component 141 may provide means for receiving at a first UE, a RRC message including a sidelink CG configuration indicating at least some parameters configured by a base station for sidelink communications between the first UE and a second UE.

For example, at sub-block 612, the block 610 may optionally include receiving the RRC message from the base station when connected to the base station or receiving the RRC message from the second UE when not connected to the base station. For example, the configuration component 141 may receive the RRC message on PDSCH 410 when connected to the base station 102 or receive the RRC message on the PSSCH 422 when not connected to the base station 102. Alternatively, receiving the physical channel control information may include receiving DCI from the base station when connected to the base station or receiving a SCI from the second UE when not connected to the base station. For instance, the configuration component 141 may receive the DCI on PDCCH 412 or receive the SCI from the second UE 104a on the PSCCH 424 (e.g., when UE 104b is the first UE).

As another example, at sub-block 614, the block 610 may optionally include receiving the RRC message from a third UE that is connected to the base station when the first UE and the second UE are not connected to the base station. For example, the configuration component 141 of the UE 104c may receive the RRC message on the PSSCH 436 from the UE 104a that is connected to the base station 102, when the first UE (e.g., UE 104c) and the second UE (e.g., 104b) are not connected to the base station. Alternatively, receiving the physical channel control information may include receiving a SCI from a third UE that is connected to the base station when the first UE and the second UE are not connected to the base station. For instance, in FIG. 5C, the UE 104b may receive the SCI on the PSCCH 424 when the UE 104b and the UE 104c are not connected to the base station 102.

At block 620, the method 600 may optionally include transmitting a second RRC message or a SCI including the at least some parameters to the second UE when the second UE is not connected to the base station. In an aspect, for example, the UE 104, the TX processor 368, the RX processor 356, and/or the controller/processor 359 may execute the sidelink CG component 140 and/or the relay component 145 to transmit a second RRC message (e.g., PSSCH 422 or PSSCH 436) or a SCI (e.g., PSCCH 424) including the at least some parameters to the second UE (e.g., UE 104b or UE 104c) when the second UE is not connected to the base station 102. The second RRC message or the SCI may include a time domain offset based on a time to transmit the second RRC message. The time domain offset may indicate a time when the sidelink CG configuration is available. The time domain offset may be selected by the base station 102 to account for the time to transmit the second RRC message or the SCI, or may be adjusted by the UE 104a to account for the time to transmit the second RRC message or the SCI. The at least some parameters may provide a grant for semi-persistent scheduling the to the second UE. Accordingly, the UE 104, the TX processor 368, the RX processor 356, and/or the controller/processor 359 executing the sidelink CG component 140 component 140 and/or the relay component 145 may provide means for transmitting a second RRC message or SCI including the at least some parameters to the second UE when the second UE is not connected to the base station.

At block 630, the method 600 may optionally include receiving physical layer signaling indicating that the sidelink CG configuration is active. In an aspect, for example, the UE 104, the TX processor 368, the RX processor 356, and/or the controller/processor 359 may execute the sidelink CG component 140 and/or the configuration component 141 to receive physical layer signaling (e.g., DCI on PDCCH 412 or SCI on PSCCH 424) indicating that the sidelink CG configuration is active. For example, the physical layer signaling may be a DCI transmitted by the base station 102 when the first UE is connected to the base station. The DCI may include a RNTI for a physical sidelink control channel that shares resources with a PDCCH. As another example, the physical layer signaling may be a SCI from the second UE when the first UE is not connected to the base station. The SCI may indicate a timing of a transmission/reception opportunity of the sidelink CG configuration. In a third example, the physical layer signaling may be a SCI from a third UE (e.g., UE 104a) when the first UE (e.g., UE 104c) and the second UE (e.g., UE 104b) are not connected to the base station 102. Accordingly, the UE 104, the TX processor 368, the RX processor 356, and/or the controller/processor 359 executing the sidelink CG component 140 and/or the configuration component 141 may provide means for receiving physical layer signaling indicating that the sidelink CG configuration is active.

At block 640, the method 600 may optionally include transmitting an ACK/NACK of the DCI on PUCCH resources indicated by the DCI or the RRC. In an aspect, for example, the UE 104, the TX processor 368, the RX processor 356, and/or the controller/processor 359 may execute the sidelink CG component 140 and/or the acknowledgment component 144 to transmit an ACK/NACK of the DCI on physical uplink control channel PUCCH resources (e.g., PUCCH 426) indicated by the DCI or the RRC. Accordingly, the UE 104, the TX processor 368, the RX processor 356, and/or the controller/processor 359 executing the sidelink CG component 140 and/or the acknowledgment component 144 may provide means for transmitting an ACK/NACK of the DCI on PUCCH resources indicated by the DCI or the RRC.

At block 650, the method 600 may optionally include relaying at least some parameters of the DCI to the second UE. In an aspect, for example, the UE 104, the TX processor 368, the RX processor 356, and/or the controller/processor 359 may execute the sidelink CG component 140 and/or the relay component 145 to relay at least some parameters of the DCI to the second UE (e.g., in SCI on PSCCH 424). Accordingly, the UE 104, the TX processor 368, the RX processor 356, and/or the controller/processor 359 executing the sidelink CG component 140 and/or the relay component 145 may provide means relaying at least some parameters of the DCI to the second UE.

At block 660, the method 600 may optionally include transmitting an ACK/NACK of the SCI on PSFCH resources indicated by the SCI or the RRC. In an aspect, for example, the UE 104, the TX processor 368, the RX processor 356, and/or the controller/processor 359 may execute the sidelink CG component 140 and/or the acknowledgment component 144 to transmit an ACK/NACK of the SCI (e.g., SCI on PSCCH 424) on PSFCH resources indicated by the SCI or the RRC. In the case of a transmitting UE, the method may include transmitting an ACK/NACK of the SCI or PSFCH message on a physical sidelink shared channel (PSSCH) or the PSFCH. The receiving UE may forward the ACK/NACK of the SCI of PSFCH message on PUCCH resources indicated by the DCI or the RRC message.

Accordingly, the UE 104, the TX processor 368, the RX processor 356, and/or the controller/processor 359 executing the sidelink CG component 140 and/or the acknowledgment component 144 may provide means for transmitting an ACK/NACK of the SCI.

At block 670, the method 600 may include transmitting or receiving a transport block for the sidelink communications on a PSSCH based on the at least some parameters. In an aspect, for example, the UE 104, the TX processor 368, the RX processor 356, and/or the controller/processor 359 may execute the sidelink CG component 140, the transmitting component 143, and/or the receiving component 142 to transmit or receive a transport block for the sidelink communications on a PSSCH based on the at least some parameters. Accordingly, the UE 104, the TX processor 368, the RX processor 356, and/or the controller/processor 359 executing the sidelink CG component 140, the transmitting component 143 and/or the receiving component 142 may provide means for transmitting or means for receiving a transport block for the sidelink communications on a PSSCH based on the at least some parameters.

At block 680, the method 600 may optionally include determining whether to retransmit the transport block based on a time period started in response to transmitting the transport block. In an aspect, for example, the UE 104, the TX processor 368, the RX processor 356, and/or the controller/processor 359 may execute the sidelink CG component 140 and/or the acknowledgment component 144 to determine whether to retransmit the transport block based on a time period started in response to transmitting the transport block. For example, at sub-block 682, the block 680 may include determining to retransmit in response to receiving a negative acknowledgment from the second UE or receiving a retransmission grant from the base station within the time period. For example, the acknowledgment component 144 may determine to retransmit in response to receiving a negative acknowledgment (e.g., on PSFCH 428, 440) from the second UE or receiving a retransmission grant from the base station 102 within the time period. Accordingly, the UE 104, the TX processor 368, the RX processor 356, and/or the controller/processor 359 executing the sidelink CG component 140 and/or the acknowledgment component 144 may provide means for determining whether to retransmit the transport block based on a time period started in response to transmitting the transport block.

Figure 7:
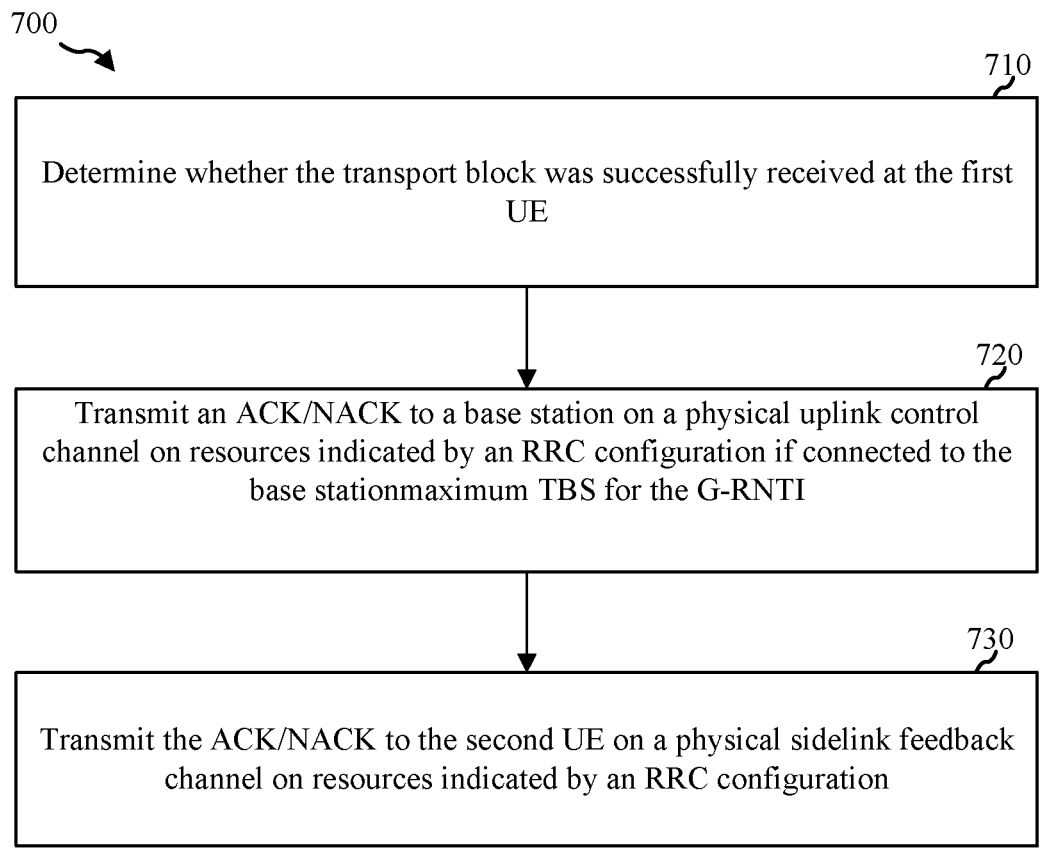
FIG. 7 is a flowchart of an example method of acknowledging a sidelink communication, in accordance with certain aspects of the present description.

FIG. 7 is a flowchart of a method 700 of wireless communication that may be performed by a UE (e.g., the UE 104, which may include the memory 360 and which may be the entire UE 104 or a component of the UE 104 such as the sidelink CG component 140, TX processor 368, the RX processor 356, and/or the controller/processor 359) for acknowledging a transport block received based on a CG. The method 700 may be performed in communication with a base station 102 including the sidelink configuration component 198

At block 710, the method 700 may include determining whether the transport block was successfully received at the first UE. For example, the receiving component 142 may determine whether the transport block (e.g., sidelink communication on PSSCH 420) was successfully received at the first UE. For instance, the receiving component 142 may decode a signal received according to the CG.

At block 720, the method 700 may include transmitting an ACK/NACK to a base station on a physical uplink control channel on resources indicated by an RRC configuration if connected to the base station. For example, the transmitting component 143 may transmit the ACK/NACK to the base station 102 on the PUCCH 426 on resources indicated by an RRC configuration (e.g., PDSCH 410) if the UE 104*a* is connected to the base station.

At block 730, the method 700 may include transmitting the ACK/NACK to the second UE on a physical sidelink feedback channel on resources indicated by an RRC configuration. For example, the transmitting component 143 may transmit the ACK/NACK to the second UE 104*b* on the PSFCH 428 on resources indicated by an RRC configuration (e.g., PDSCH 410). The resources for the ACK/NACK of a first occasion of the sidelink CG configuration on one or both of the PUCCH and PSFCH may be indicated by physical layer signaling (e.g., the DCI or SCI) and the RRC configuration may indicate the resource for the ACK/NACK of subsequent occasions.

Figure 8:
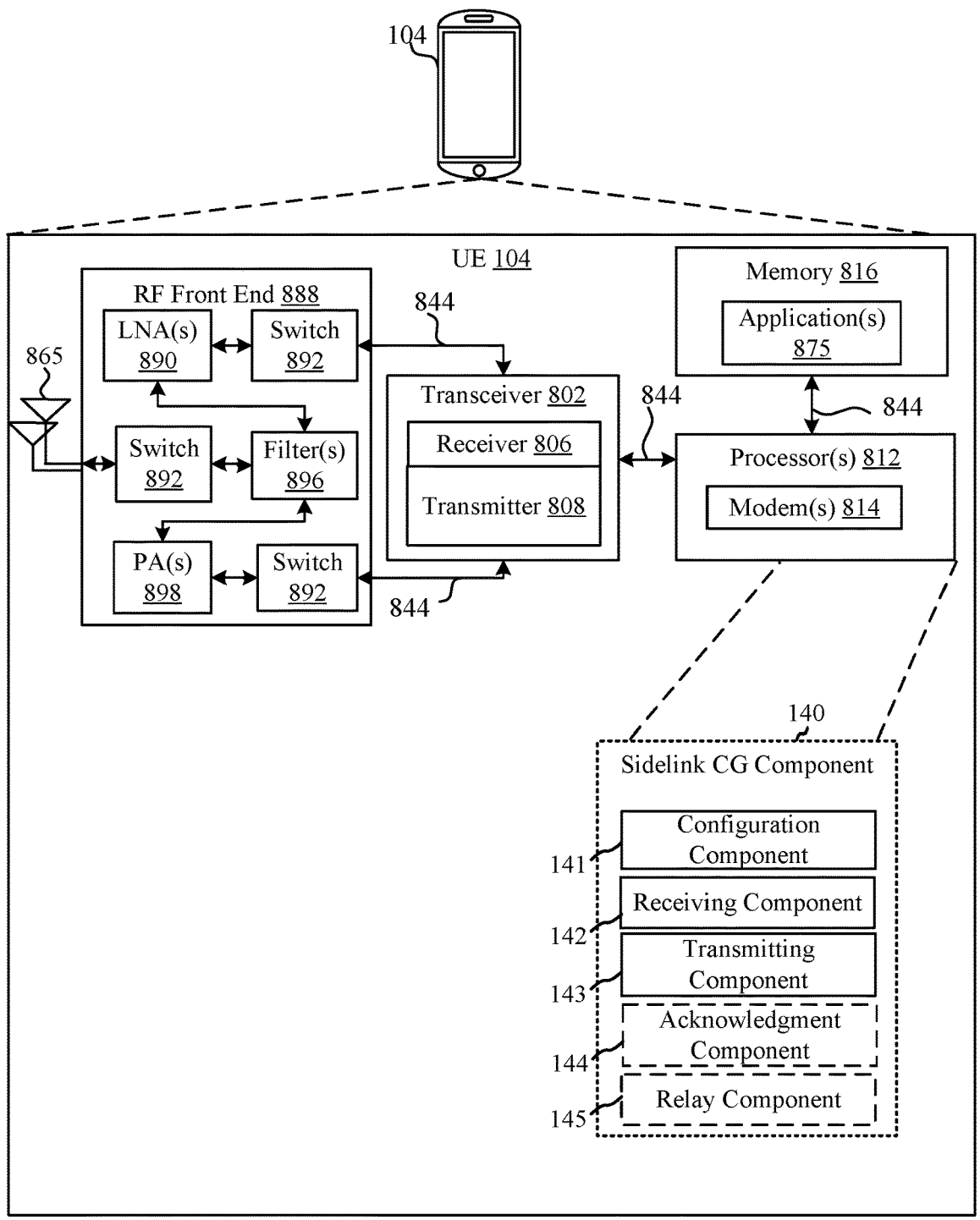
FIG. 8 is a schematic diagram of example components of the UE of FIG. 1, in accordance with certain aspects of the present description.

Referring to FIG. 8, one example of an implementation of UE 104 (e.g., UE 104*a*, UE 104*b*, or UE 104*c*) may include a variety of components, some of which have already been described above, but including components such as one or more processors 812 and memory 816 and transceiver 802 in communication via one or more buses 844, which may operate in conjunction with modem 814, and sidelink CG component 140 to enable one or more of the functions described herein related to sidelink communications using a CG. Further, the one or more processors 812, modem 814, memory 816, transceiver 802, RF front end 888 and one or more antennas 865 may be configured to support voice and/or data calls (simultaneously or non-simultaneously) in one or more radio access technologies. The antennas 865 may include one or more antennas, antenna elements, and/or antenna arrays.

In an aspect, the one or more processors 812 may include a modem 814 that uses one or more modem processors. The various functions related to sidelink CG component 140 may be included in modem 814 and/or processors 812 and, in an aspect, may be executed by a single processor, while in other aspects, different ones of the functions may be executed by a combination of two or more different processors. For example, in an aspect, the one or more processors 812 may include any one or any combination of a modem processor, or a baseband processor, or a digital signal processor, or a transmit processor, or a receiver processor, or a transceiver processor associated with transceiver 802. In other aspects, some of the features of the one or more processors 812 and/or modem 814 associated with sidelink CG component 140 may be performed by transceiver 802.

Also, memory 816 may be configured to store data used herein and/or local versions of applications 875, Sidelink CG component 140 and/or one or more of subcomponents thereof being executed by at least one processor 812. Memory 816 may include any type of computer-readable medium usable by a computer or at least one processor 812, such as random access memory (RAM), read only memory (ROM), tapes, magnetic discs, optical discs, volatile memory, non-volatile memory, and any combination thereof. In an aspect, for example, memory 816 may be a non-transitory computer-readable storage medium that stores one or more computer-executable codes defining sidelink CG component 140 and/or one or more of subcomponents thereof, and/or data associated therewith, when UE 104 is operating at least one processor 812 to execute sidelink CG component 140 and/or one or more subcomponents thereof.

Transceiver 802 may include at least one receiver 806 and at least one transmitter 808. Receiver 806 may include hardware, firmware, and/or software code executable by a processor for receiving data, the code comprising instructions and being stored in a memory (e.g., computer-readable medium). Receiver 806 may be, for example, a radio frequency (RF) receiver. In an aspect, receiver 806 may receive signals transmitted by at least one base station 102. Additionally, receiver 806 may process such received signals, and also may obtain measurements of the signals, such as, but not limited to, Ec/Io, SNR, RSRP, RSSI, etc. Transmitter 808 may include hardware, firmware, and/or software code executable by a processor for transmitting data, the code comprising instructions and being stored in a memory (e.g., computer-readable medium). A suitable example of transmitter 808 may including, but is not limited to, an RF transmitter.

Moreover, in an aspect, UE 104 may include RF front end 888, which may operate in communication with one or more antennas 865 and transceiver 802 for receiving and transmitting radio transmissions, for example, wireless communications transmitted by at least one base station 102 or wireless transmissions transmitted by UE 104. RF front end 888 may be connected to one or more antennas 865 and may include one or more low-noise amplifiers (LNAs) 890, one or more switches 892, one or more power amplifiers (PAs) 898, and one or more filters 896 for transmitting and receiving RF signals.

In an aspect, LNA 890 may amplify a received signal at a desired output level. In an aspect, each LNA 890 may have a specified minimum and maximum gain values. In an aspect, RF front end 888 may use one or more switches 892 to select a particular LNA 890 and its specified gain value based on a desired gain value for a particular application.

Further, for example, one or more PA(s) 898 may be used by RF front end 888 to amplify a signal for an RF output at a desired output power level. In an aspect, each PA 898 may have specified minimum and maximum gain values. In an aspect, RF front end 888 may use one or more switches 892 to select a particular PA 898 and its specified gain value based on a desired gain value for a particular application.

Also, for example, one or more filters 896 may be used by RF front end 888 to filter a received signal to obtain an input RF signal. Similarly, in an aspect, for example, a respective filter 896 may be used to filter an output from a respective PA 898 to produce an output signal for transmission. In an aspect, each filter 896 may be connected to a specific LNA 890 and/or PA 898. In an aspect, RF front end 888 may use one or more switches 892 to select a transmit or receive path using a specified filter 896, LNA 890, and/or PA 898, based on a configuration as specified by transceiver 802 and/or processor 812.

As such, transceiver 802 may be configured to transmit and receive wireless signals through one or more antennas 865 via RF front end 888. In an aspect, transceiver 802 may be tuned to operate at specified frequencies such that UE 104 can communicate with, for example, one or more base stations 102 or one or more cells associated with one or more base stations 102. In an aspect, for example, modem 814 may configure transceiver 802 to operate at a specified frequency and power level based on the UE configuration of the UE 104 and the communication protocol used by modem 814.

In an aspect, modem 814 may be a multiband-multimode modem, which can process digital data and communicate with transceiver 802 such that the digital data is sent and received using transceiver 802. In an aspect, modem 814 may be multiband and be configured to support multiple frequency bands for a specific communications protocol. In an aspect, modem 814 may be multimode and be configured to support multiple operating networks and communications protocols. In an aspect, modem 814 may control one or more components of UE 104 (e.g., RF front end 888, transceiver 802) to enable transmission and/or reception of signals from the network based on a specified modem configuration. In an aspect, the modem configuration may be based on the mode of the modem and the frequency band in use. In another aspect, the modem configuration may be based on UE configuration information associated with UE 104 as provided by the network during cell selection and/or cell reselection.

Figure 9:
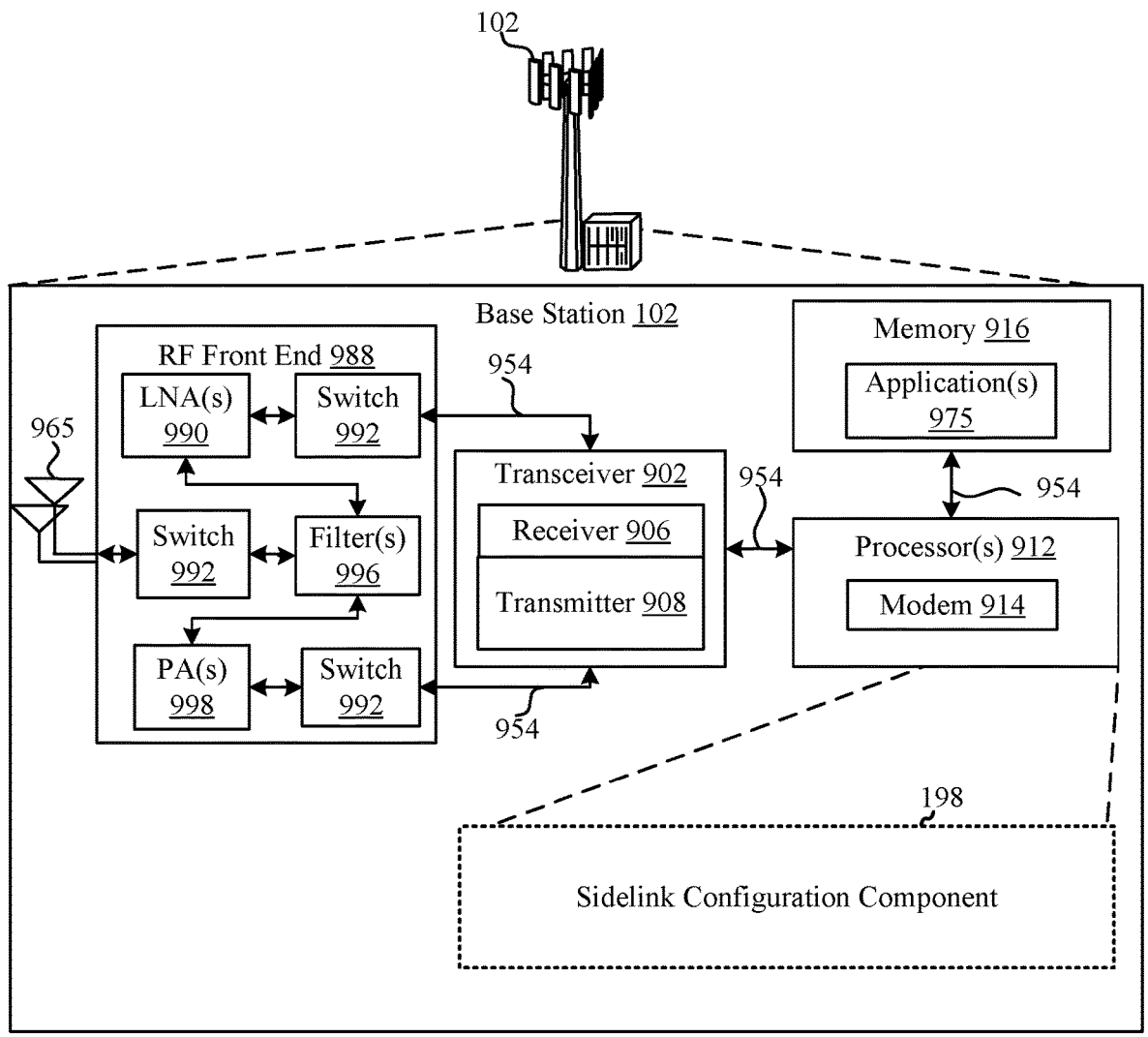
FIG. 9 is a schematic diagram of example components of the base station of FIG. 1, in accordance with certain aspects of the present description.

Referring to FIG. 9, one example of an implementation of base station 102 may include a variety of components, some of which have already been described above, but including components such as one or more processors 912 and memory 916 and transceiver 902 in communication via one or more buses 954, which may operate in conjunction with modem 914 and sidelink configuration component 198 to enable one or more of the functions described herein related configured grants for sidelink.

The transceiver 902, receiver 906, transmitter 908, one or more processors 912, memory 916, applications 975, buses 954, RF front end 988, LNAs 990, switches 992, filters 996, PAs 998, and one or more antennas 965 may be the same as or similar to the corresponding components of UE 104, as described above, but configured or otherwise programmed for base station operations as opposed to UE operations.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication, comprising:
receiving at a first user equipment (UE), a radio resource control (RRC) message or physical channel control information including a sidelink configured grant (CG) configuration indicating at least some parameters configured by a base station to schedule multiple sidelink communications between the first UE and a second UE;
transmitting, from the first UE, a second RRC message including the at least some parameters of the sidelink CO configuration to the second UE on a physical sidelink shared channel (PSSCH) when the second UE is not connected to the base station, wherein the second RRC message includes a time domain offset based on a time to transmit the second RRC message, the time domain offset indicating a time when the sidelink CO configuration is available; and
transmitting or receiving, at the first UE, a transport block for the sidelink communications on the PSSCH based on the at least some parameters.

2. The method of claim 1, wherein receiving the RRC message comprises receiving the RRC message from the base station when connected to the base station.

3. The method of claim 1, wherein receiving the physical channel control information comprises receiving a downlink control information (DCI) from the base station when connected to the base station.

4. The method of claim 1, wherein receiving the RRC message including the sidelink CG configuration comprises receiving the RRC message from a third UE that is connected to the base station when the first UE and the second UE are not connected to the base station.

5. The method of claim 1, wherein receiving the physical channel control information comprises receiving a sidelink control information (SCI) from a third UE that is connected to the base station when the first UE and the second UE are not connected to the base station.

6. The method of claim 1, wherein the at least some parameters provide a grant for semi-persistent scheduling to the second UE.

7. The method of claim 1, further comprising receiving physical layer signaling indicating that the sidelink CG configuration is active.

8. The method of claim 7, wherein the physical layer signaling is a downlink control information (DCI) transmitted by the base station when the first UE is connected to the base station.

9. The method of claim 8, wherein the DCI includes a radio network temporary identifier (RNTI) for a physical sidelink control channel that shares resources with a physical downlink control channel.

10. The method of claim 8, further comprising transmitting an acknowledgment or negative acknowledgment (ACK/NACK) of the DCI on physical uplink control channel (PUCCH) resources indicated by the DCI or the RRC message.

11. The method of claim 8, further comprising relaying at least some parameters of the DCI to the second UE in a sidelink control information (SCI).

12. The method of claim 11, further comprising receiving an ACK/NACK of the SCI on a physical sidelink feedback channel resource indicated by the SCI or higher layer signaling.

13. The method of claim 12, further comprising forwarding the ACK/NACK of the SCI on physical uplink control channel (PUCCH) resources indicated by the DCI or the RRC message.

14. The method of claim 12, further comprising transmitting a media access control (MAC) control element (CE) indicating the ACK/NACK of the SCI.

15. The method of claim 7, wherein the physical layer signaling is a sidelink control information (SCI) or a physical sidelink feedback channel (PSFCH) message from the second UE when the first UE is not connected to the base station.

16. The method of claim 15, Wherein the SCI indicates a timing of a transmission/reception opportunity of the sidelink CG configuration.

17. The method of claim 15, further comprising transmitting an ACK/NACK of the SCI or the PSFCH message on a physical sidelink shared channel (PSSCH) or the PSFCH.

18. The method of claim 17, wherein the second UE forwards the ACK/NACK of the SCI of PSFCH message on physical uplink control channel (PUCCH) resources indicated by the physical channel control information or the RRC message.

19. The method of claim 7, wherein the physical layer signaling is a sidelink control information (SCI) from a third UE when the first UE and the second UE are not connected to the base station.

20. The method of claim 15, further comprising transmitting an ACK/NACK of the SCI on physical sidelink feedback channel (PSFCH) resources indicated by the SCI or the RRC message.

21. The method of claim 1, further comprising determining whether to retransmit the transport block based on expiration of a time period started in response to transmitting the transport block.

22. The method of claim 21, wherein determining whether to retransmit comprises determining to retransmit in response to receiving a negative acknowledgment from the second UE or receiving a retransmission grant from the base station within the time period.

23. The method of claim 1, further comprising:
determining whether the transport block was successfully received at the first UE;
transmitting an ACK/NACK to a base station on a physical uplink control channel (PUCCH) on resources indicated by an RRC configuration if connected to the base station; and
transmitting the ACK/NACK to the second UE on a physical sidelink feedback channel (PSFCH) on resources indicated by an RRC configuration.

24. The method of claim 21, wherein resources for the ACK/NACK of a first occasion of the sidelink CG configuration on one or both of the PUCCH and PSFCH are indicated by physical layer signaling and the RRC configuration indicates the resources for the ACK/NACK of subsequent occasions.

25. An apparatus for wireless communication, comprising:
a memory; and
one or more processors coupled to the memory, the one or more processors individually or collectively configured to cause the apparatus to:
receive at a first user equipment (UE), a radio resource control (RRC) message including a sidelink configured grant (CG) configuration indicating at least some parameters configured by a base station for sidelink communications between the first UE and a second UE:
transmit, from the first UE, a second RRC message including the at least some parameters of the sidelink CG configuration to the second UE on a physical sidelink shared channel (PSSCH) when the second UE is not connected to the base station, wherein the second RRC message includes a time domain offset based on a time to transmit the second RRC message, the time domain offset indicating a time when the sidelink CG configuration is available; and
transmit or receive a transport block for the sidelink communications on the PSSCH based on the at least some parameters.

26. The apparatus of claim 25, wherein the one or more processors individually or collectively are further configured to cause the apparatus to receive physical layer signaling indicating that the sidelink CG configuration is active.

27. An apparatus for wireless communication, comprising:
means for receiving at a first user equipment (UE), a radio resource control (RRC) message including a sidelink configured grant (CG) configuration indicating at least some parameters configured by a base station for sidelink communications between the first UE and a second UE;
means for transmitting, from the first UE, a second RRC message including the at least some parameters of the sidelink CG configuration to the second UE on a physical sidelink shared channel (PSSCH) when the second UE is not connected to the base station, wherein the second RRC message includes a time domain offset based on a time to transmit the second RRC message, the time domain offset indicating a time when the sidelink CG configuration is available; and
means for transmitting or means for receiving a transport block for the sidelink communications on the PSSCH based on the at least some parameters.

28. A non-transitory computer-readable medium storing computer executable code, the code when executed by a processor causes the processor to:
receive at a first user equipment (UE), a radio resource control (RRC) message including a sidelink configured grant (CG) configuration indicating at least some parameters configured by a base station for sidelink communications between the first UE and a second UE;
transmit, from the first UE, a second RRC message including the at least some parameters of the sidelink CG configuration to the second UE on a physical sidelink shared channel (PSSCH) when the second UE is not connected to the base station, wherein the second RRC message includes a time domain offset based on a time to transmit the second RRC message, the time domain offset indicating a time when the sidelink CG configuration is available; and
transmit or receive a transport block for the sidelink communications on the PSSCH based on the at least some parameters.

* * * * *